United States Patent [19]
Altieri

[11] Patent Number: 5,692,756
[45] Date of Patent: Dec. 2, 1997

[54] REFRIGERATION COMPRESSOR AND COMPRESSOR SEAL

[75] Inventor: Keith L. Altieri, Elgin, Ill.

[73] Assignee: Rexnord Corporation, Milwaukee, Wis.

[21] Appl. No.: 532,106

[22] Filed: Sep. 22, 1995

[51] Int. Cl.⁶ .................................................. F16J 15/34
[52] U.S. Cl. ............................ 277/30; 277/65; 277/85
[58] Field of Search ............................. 277/30, 37, 65, 277/85, 88, 96.2, 136, DIG. 6

[56] References Cited

U.S. PATENT DOCUMENTS

| | | | |
|---|---|---|---|
| 2,296,724 | 9/1942 | McCormack | 277/88 |
| 2,943,453 | 7/1960 | Jonkers et al. | 277/65 |
| 3,122,375 | 2/1964 | Greenwald | 277/88 |
| 3,276,780 | 10/1966 | Andresen et al. | 277/88 |
| 3,288,474 | 11/1966 | Gits | 277/88 |
| 3,372,076 | 3/1968 | Wilkinson | 277/88 |
| 3,716,244 | 2/1973 | Hellwig | 277/65 |
| 4,451,049 | 5/1984 | Charhut | 277/88 |
| 4,921,258 | 5/1990 | Fournier et al. | 277/215 |
| 5,082,294 | 1/1992 | Toth et al. | 277/37 |
| 5,332,361 | 7/1994 | Bras et al. | 277/85 |

FOREIGN PATENT DOCUMENTS

| | | | |
|---|---|---|---|
| 226082 | 7/1962 | Austria | 277/65 |
| 761108 | 11/1956 | United Kingdom | 277/65 |

OTHER PUBLICATIONS

"Engineered FLuid Sealing"; Crane Packing Company; pp. 115–118, 168–173, Sep. 1981.

"Metals Handbook"; 9th ed.; pp. 390, 392, and 417, Apr. 1982.

*Primary Examiner*—Scott Cummings
*Attorney, Agent, or Firm*—Michael, Best & Friedrich

[57] ABSTRACT

A refrigeration compressor including a compressor housing, a compressor shaft rotatably positioned within the housing, a refrigerant positioned within the housing, a face seal operatively positioned between the housing and the shaft, and a lip seal operatively positioned between the housing and the shaft. The lip seal and the primary seal collectively form a seal cavity for retaining fluid adjacent to the primary seal. An inlet port is positioned adjacent to the seal cavity, and a bearing rotatably supports the shaft within the housing. The lip seal is operatively positioned between the inlet port and the bearing. A bypass channel allows fluid (e.g., oil and refrigerant) to bypass a top portion of the lip seal, thereby permitting lubrication of the bearing. The face seal includes a seal nose and a bellows operatively associated with the seal nose. The seal nose preferably includes a maximum of about 0.5 weight percent lead. For example, the seal nose can include a tin bronze alloy, such as alloy C90300.

17 Claims, 2 Drawing Sheets

REFRIGERATION COMPRESSOR AND COMPRESSOR SEAL

FIELD OF THE INVENTION

The present invention generally relates to the field of refrigeration compressors and, more particularly to refrigeration compressor seals for sealing the interface between a compressor shaft and a compressor housing.

BACKGROUND OF THE INVENTION

Refrigeration compressors are used to compress refrigerants, such as chlorofluorocarbons ("CFCs"), as part of a standard vapor-compression refrigeration cycle. Typically, the gaseous refrigerant is mixed with a liquid lubricating medium, such as oil, immediately before entering the compressor. The lubricating medium facilitates easy handling of the refrigerant during compression, and further lubricates the compressor components (e.g. bearings, seals, etc.) to reduced component wear. After compression, the lubricating medium and refrigerant are separated.

Refrigeration compressors typically include a compressor shaft positioned within a compressor housing, and a bearing unit for rotatably supporting the compressor shaft within the housing. The lubricating medium and refrigerant enter the compressor through an inlet port on one side of the bearing unit, and pass through the bearing unit to provide lubrication. A compressor shaft seal inhibits leakage of the lubricating medium and/or refrigerant between the compressor housing and the compressor shaft. Compressor shaft seals typically include elastomer members (e.g., a rubber seal formed around a steel spring) for providing a compliant biasing force to maintain other seal components in their proper position. In addition, compressor shaft seals can include a seal nose made from carbon graphite or leaded bearing bronze. The lead in typical bearing bronze is desirable in that it is believed to improve wear resistance of the seal nose.

Elastomer members in shaft seals can degrade due to long term exposure to high temperatures and pressures and/or due to chemical reaction with certain lubricating mediums and refrigerants, such as hydrofluorocarbons ("HFCs"). In addition, carbon graphite and elastomers can include small gaps or voids that provide a place for small gas bubbles to enter. These small bubbles can expand and contract considerably due to the large pressure fluctuations inherent in compressors. Such expansions of gas bubbles can rapidly deteriorate the material. Further, seal noses made from typical seal nose materials can show excessive wear and can fail prematurely, particularly when used in high temperature and high pressure environments, such as in a compressor used to compress HFC refrigerants.

SUMMARY OF THE INVENTION

The present invention is directed an improved compressor shaft seal and seal assembly for inhibiting leakage of lubricating medium and refrigerant in a compressor, and to a compressor including such a seal. The compressor shaft seal is specifically designed to be used in high temperature and high pressure environments, such as can be encountered when compressing HFC refrigerants, but can also be used with other types of refrigerants.

In one aspect, the present invention provides a refrigeration compressor including a compressor housing, a compressor shaft rotatably positioned within the housing, a refrigerant positioned within the housing, a primary seal operatively positioned between the housing and the shaft, and a lip seal operatively positioned between the housing and the shaft. The lip seal and the primary seal collectively form a seal cavity for retaining fluid adjacent to the primary seal. In one embodiment, the compressor further includes an inlet port positioned adjacent to the seal cavity, and a bearing for rotatably supporting the shaft within the housing. The lip seal is operatively positioned between the inlet port and the bearing.

The compressor can further include a bypass channel adjacent to a top portion of the lip seal. The bypass channel permits flow of fluid (e.g., oil and refrigerant) around the lip seal to permit lubrication of the bearing. The lip seal is preferably in sliding contact with a mating ring (e.g., mounted to the shaft).

In another embodiment, the primary seal includes a face seal including a seal nose and a bellows operatively associated with the seal nose. The seal nose preferably includes a maximum of about 0.5 weight percent lead. For example, the seal nose can include a tin bronze alloy, such as alloy C90300. Contrary to conventional knowledge, the substantial removal of lead produces a seal nose with acceptable wear characteristics, particularly in high temperature and high pressure environments.

In yet another embodiment, the face seal further includes a mating ring positioned adjacent to the seal nose, and a tolerance ring drive positioned to secure the mating ring to the compressor shaft. The mating ring preferably includes hardened tool steel (e.g., M2 tool steel) or cast iron, and the tolerance ring drive preferably includes steel and has a plurality of indentations. With this embodiment, the use of elastomer-based tolerance ring drives has been eliminated.

DETAILED DESCRIPTION

Figure 1:
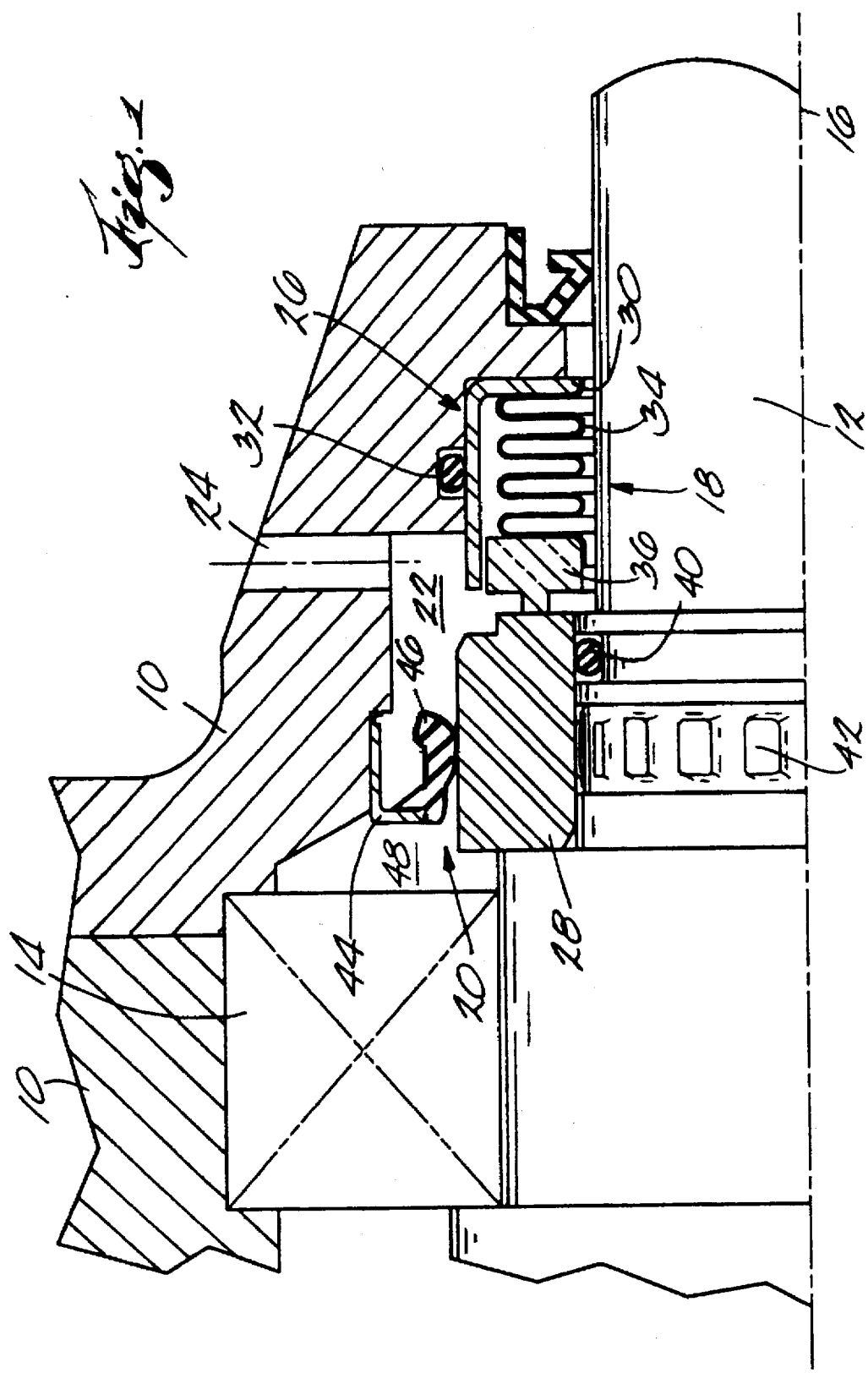
FIG. 1 is a partial section view of a compressor embodying the present invention.

The compressor illustrated in FIG. 1 includes a compressor housing 10, a compressor shaft 12 positioned within the compressor housing 10, and a bearing unit 14 rotatably supporting the compressor shaft 12 within the compressor housing 10 for rotation about a center axis 16. A shaft seal 18 inhibits leakage of fluid (e.g., oil and refrigerant) through the space between the compressor housing 10 and the compressor shaft 12, and a lip seal 20 retains fluid within a seal cavity 22 between the compressor housing 10 and the compressor shaft 12. Each of the components cooperates with the other components to provide a compressor embodying the features of the present invention.

The compressor housing 10 includes an oil inlet port 24 designed to be attached to a fluid supply conduit (not shown). The fluid supply conduit provides a pressurized oil-refrigerant mixture through the oil inlet port 24 and into the seal cavity 22 between the compressor housing 10 and the compressor shaft 12. The oil-refrigerant mixture can include any appropriate combination of lubricating oil and refrigerant, as is generally known in the art. In the illustrated apparatus, the oil-refrigerant mixture comprises an ISO 120 polyolester oil mixed with an HFC refrigerant.

The bearing unit 14 is secured within the compressor housing 10 to rotatably support the compressor shaft 12. The bearing unit 14 can comprise any appropriate compressor bearing as is known in the art.

The shaft seal 18 of the illustrated embodiment comprises a face seal 26 and an annular mating ring 28. The face seal 26 includes a bronze seal shell 30 press fit within the compressor housing 10. The seal shell 30 is an annular-shaped member having an L-shaped cross-section. A housing O-ring 32 provides a static seal between the seal shell 30 and the compressor housing 10.

A corrugated bellows 34 is soldered to the seal shell 30 and extends toward the mating ring 28. The corrugated bellows 34 can be made from any appropriate material, such as beryllium copper, phosphor bronze, brass, stainless steel, or nickel. In addition, different types of bellows 34 can be used, such as edge-welded bellows 34, electrodeposited bellows 34, mechanically-formed bellows 34, hydroformed or any other appropriate bellows 34. In the illustrated embodiment, the bellows 34 comprises a hydroformed bellows 34.

An annular seal nose 36 is soldered to the bellows 34, and is positioned adjacent the end of the seal shell 30. The seal nose 36 comprises a tin bronze alloy having less than about 0.5 weight percent lead. More specifically, the illustrated seal nose 36 comprises C90300, which nominally includes 88 weight percent copper, 8 weight percent tin, and 4 weight percent zinc. The bellows 34 provides a compliant mounting for the seal nose 36 to thereby compliantly bias the seal nose 36 toward the mating ring 28. In addition, the bellows 34 holds the seal nose 36 rotationally stationary relative to the compressor housing 10, thereby preventing the seal nose 36 from spinning with the compressor shaft 12 and associated mating ring 28.

The mating ring 28 is positioned on the compressor shaft 12 adjacent to the seal nose 36. The mating ring 28 is made from an M2 hardened tool steel. This particular material has been found to work especially well in combination with the C90300 tin bronze alloy seal nose 36 and the above-described HFC refrigerant. A shaft O-ring 40 provides a static seal between the mating ring 28 and the compressor shaft 12. Alternatively, hardened cast iron could also make a suitable mating ring.

The mating ring 28 is secured to the compressor shaft 12 using a tolerance ring drive. The illustrated tolerance ring drive is a corrugated ring drive 42 made from stainless steel. For example, a corrugated ring drive 42 sold by U.S. Tolerance Rings under part number BN131019 may be used. Utilization of a corrugated ring drive 42 has been found to work well in elevated temperatures, and is particularly beneficial when used with compressors using the above-described HFC refrigerant since the use of elastomers is reduced.

The lip seal 20 is press fit within the compressor housing 10 adjacent to the mating ring 28. The lip seal 20 includes an annular base portion 44 supporting an annular seal portion 46 in such a manner that the seal portion 46 is in biased contact with the mating ring 28. The seal portion 46 comprises a flexible high temperature material that provides a seal against the mating ring 28. For example, materials such as fluorocarbon (sold under the trademark "Viton"), polytetrafluoroethylene (sold under the trademark "Teflon"), highly saturated nitrile (HNBR), or epichlorohydrin (ECO) could be used. This seal defines a barrier between a bearing cavity 48 that contains the bearing unit 14, and the seal cavity 22 that retains fluid after the compressor has stopped running, as will be described below in more detail.

Figure 2:
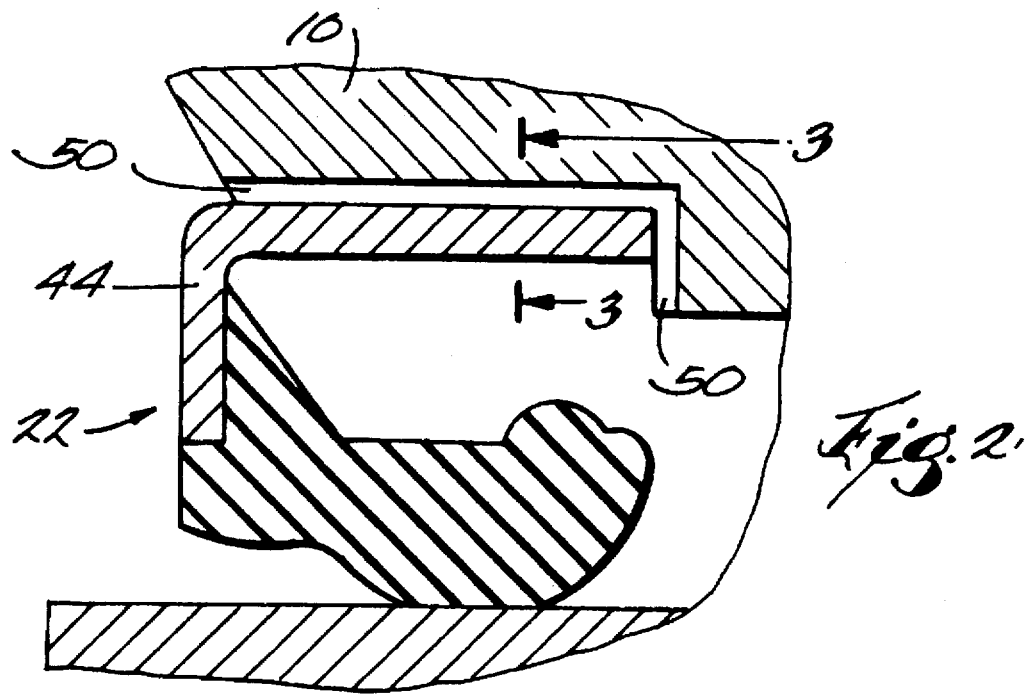
FIG. 2 is an enlarged side section view of the lip seal illustrated in FIG. 1.
Figure 3:
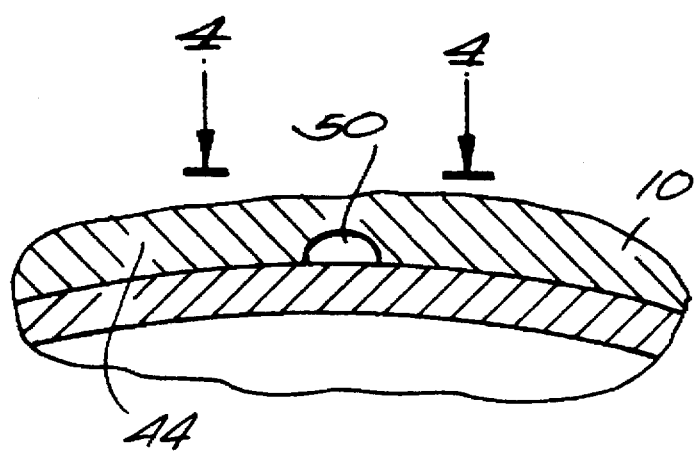
FIG. 3 is a section view taken along line 3—3 in FIG. 2.

Referring to FIGS. 2–3, the housing 10 includes a bypass channel 50. The channel 50 allows for the flow of fluid from the seal cavity 22 to the bearing cavity 48 to thereby provide lubrication to the bearing unit 14. The channel 50 is only formed in an upper portion of the housing 10 so that, when the compressor is turned off and the flow of fluid stops, the fluid within the seal cavity 22 will not drain out of the seal cavity 22. That is, the fluid will be retained within the seal cavity 22 by virtue of the lip seal 20 and shaft seal 18, and by virtue of the provision of the channel 50 in the upper portion of the housing 10 only. This feature advantageously maintains fluid adjacent to the interface between the seal nose 36 and the mating ring 28, thereby reducing friction between the two members when the compressor is initially started. Without such a feature, the interface between the seal nose 36 and the mating ring 28 would essentially be dry when the compressor is initially started, and could result in excessive wear between the two parts. It should be appreciated that the bypass channel 50 could be formed into the base portion 44 of the lip seal 20, rather than in the housing 10.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A refrigeration seal assembly for use in inhibiting the loss of refrigerant between a compressor shaft and a compressor housing, said seal assembly comprising:

a face seal operatively positionable between the compressor housing and the compressor shaft, said face seal including a seal nose and a bellows operatively associated with said seal nose;

a lip seal operatively positionable between the compressor housing and the compressor shaft, said lip seal and said face seal collectively forming a seal cavity for retaining fluid adjacent to said face seal; and a bypass channel adjacent a top portion of said lip seal and for bypassing fluid from said seal cavity past said lip seal.

2. A refrigeration seal assembly as claimed in claim 1, wherein said seal nose comprises a maximum of about 0.5 weight percent lead.

3. A refrigeration seal assembly as claimed in claim 2, wherein said seal nose comprises a tin bronze alloy.

4. A refrigeration seal assembly as claimed in claim 3, wherein said tin bronze alloy comprises alloy C90300.

5. A refrigeration seal assembly as claimed in claim 4, further comprising a mating ring positionable in sliding contact with both said seal nose and said lip seal.

6. A refrigeration seal assembly as claimed in claim 5, wherein said mating ring comprises hardened steel.

7. A refrigeration seal assembly as claimed in claim 5, further comprising a mounting ring drive for securing said mating ring to the compressor shaft.

8. A refrigeration seal assembly as claimed in claim 7, wherein said mounting ring drive comprises a steel band having a plurality of indentations.

9. A refrigeration compressor for compressing a refrigerant, said compressor comprising:

a refrigeration compressor housing;

a refrigeration compressor shaft rotatably positioned within said housing;

a refrigerant positioned within said housing;

a primary seal operatively positioned between said housing and said shaft;

a lip seal operatively positioned between said housing and said shaft, said lip seal and said primary seal collectively forming a seal cavity for retaining fluid adjacent to said primary seal; and a bypass channel adjacent a top portion of said lip seal and for bypassing fluid from said seal cavity past said lip seal.

10. A refrigeration compressor as claimed in claim 9, wherein said compressor further includes:

an inlet port positioned adjacent to said seal cavity; and a bearing for rotatably supporting said shaft within said housing, wherein said lip seal is operatively positioned between said inlet port and said bearing.

11. A refrigeration compressor as claimed in claim 9, wherein said primary seal includes a mating ring positioned in sliding contact with said lip seal.

12. A refrigeration compressor as claimed in claim 9, wherein said primary seal comprises a face seal including:

a seal nose; and a bellows operatively associated with said seal nose.

13. A refrigeration compressor as claimed in claim 12, wherein said seal nose comprises a maximum of about 0.5 weight percent lead.

14. A refrigeration compressor as claimed in claim 12, wherein said face seal further includes:

a mating ring positioned in sliding contact with said seal note; and a mounting ring drive positioned to secure said mating ring to said compressor shaft.

15. A refrigeration compressor as claimed in claim 14, wherein said mating ring comprises hardened steel.

16. A refrigeration compressor as claimed in claim 14, wherein said mounting ring drive comprises a steel band having a plurality of indentations.

17. A refrigeration compressor for compressing a refrigerant, said compressor comprising:

a refrigeration compressor housing;

a refrigeration compressor shaft rotatably positioned within said housing;

a refrigerant positioned within said housing;

a primary seal operatively positioned between said housing and said shaft;

a lip seal operatively positioned between said housing and said shaft, said lip seal and said primary seal collectively forming a seal cavity for retaining fluid adjacent to said primary seal;

an inlet port positioned adjacent to said seal cavity, said inlet port providing pressurized fluid to the seal cavity; and a bearing for rotatably supporting said shaft within said housing, wherein said lip seal is operatively positioned between said inlet port and said bearing.

\* \* \* \* \*

UNITED STATES PATENT AND TRADEMARK OFFICE
CERTIFICATE OF CORRECTION

PATENT NO. : 5,692,756
DATED : December 2, 1997
INVENTOR(S) : Keith L. Altieri

It is certified that error appears in the above-indentified patent and that said Letters Patent is hereby corrected as shown below:

Column 4, line 57, "5. A refrigeration seal assembly as claimed in claim 4," should be "5. A refrigeration seal assembly as claimed in claim 1,"

Signed and Sealed this

Seventeenth Day of February, 1998

*Attest:*

BRUCE LEHMAN

*Attesting Officer*             *Commissioner of Patents and Trademarks*